United States Patent
Zhu

(10) Patent No.: US 9,038,701 B2
(45) Date of Patent: May 26, 2015

(54) SYSTEMS AND METHODS FOR PRODUCING A HARDWEARING ALLOY MATERIAL

(71) Applicant: Yuanji Zhu, Atlanta, GA (US)

(72) Inventor: Yuanji Zhu, Atlanta, GA (US)

(*) Notice: Subject to any disclaimer, the term of this patent is extended or adjusted under 35 U.S.C. 154(b) by 0 days.

(21) Appl. No.: 14/312,215

(22) Filed: Jun. 23, 2014

(65) Prior Publication Data

US 2014/0374049 A1 Dec. 25, 2014

Related U.S. Application Data

(60) Provisional application No. 61/838,970, filed on Jun. 25, 2013.

(51) Int. Cl.
| | |
|---|---|
| *B22D 19/14* | (2006.01) |
| *B22D 19/00* | (2006.01) |
| *C04B 35/10* | (2006.01) |
| *C22C 1/02* | (2006.01) |
| *C22C 32/00* | (2006.01) |

(52) U.S. Cl.
CPC ............... *B22D 19/14* (2013.01); *C04B 35/10* (2013.01); *C22C 1/02* (2013.01); *C22C 32/00* (2013.01)

(58) Field of Classification Search
CPC .......... B22D 19/00; B22D 19/02; B22D 19/14
USPC .......................................................... 164/57.1
See application file for complete search history.

(56) References Cited

U.S. PATENT DOCUMENTS 5,896,911 A * 4/1999 Gegel ............................ 164/4.1

* cited by examiner

*Primary Examiner* — Kevin P Kerns
*Assistant Examiner* — Steven Ha
(74) *Attorney, Agent, or Firm* — Clayton, McKay & Bailey, PC

(57) ABSTRACT

Described herein are systems and methods for producing a hardwearing or wear-resistant material. In one aspect, a first group of materials comprising zirconium dioxide ($ZrO_2$), aluminum oxide ($Al_2O_3$), and one or both of calcium oxide (CaO) and yttrium oxide ($Y_2O_3$) may be mixed, heated, and cooled to yield a first mixture. The first mixture may be used to generate granules that may then be mixed with a second group of materials comprising iron, nickel, manganese, titanium, carbon, chromium, and optionally, a paraffin, to yield a second mixture. The second mixture may then be compressed, cast, cooled, and heat treated to yield the hardwearing or wear-resistant material.

20 Claims, 4 Drawing Sheets

SYSTEMS AND METHODS FOR PRODUCING A HARDWEARING ALLOY MATERIAL

This non-provisional application claims the benefit of priority to U.S. Provisional Patent Application No. 61/838,970, filed Jun. 25, 2013, which is expressly incorporated herein by reference.

FIELD OF THE DISCLOSURE

The embodiments relate generally to systems and methods for preparing a hardwearing alloy material and, more specifically, systems and methods for producing an alloy material that is both lighter and more wear-resistant than currently available composite materials.

BACKGROUND

In many contexts, including construction, mining, and industrial settings, heavy wear on equipment and/or machine components is an unavoidable reality. To extend the useful life of these components, they may be produced from hardwearing or wear-resistant materials. These hardwearing materials exhibit specific properties that enable them to withstand one or more forms of wear, including but not limited to, abrasion, stress, impact, fatigue, and corrosion.

Research and development surrounding the production of hardwearing materials has been steadily gaining in popularity for many years as new applications for the materials are found. Such materials are commonly incorporated into industrial and/or construction equipment, including composite hammers, liners, jaw plates, bucket teeth, helical blades, mixers, shovels, and pavers, just to name a few examples. Hardwearing materials have also been implemented in the context of composite pipes and roll machinery parts. Moreover, with the continual improvement and optimization of processes for producing these wear-resistant materials, they will only gain in popularity and be used in other contexts.

In fact, industry participants anticipate that the hardwearing materials market will grow steadily over the next decade and beyond. This growth will be propelled by the world's ever-rising population and the corresponding need for infrastructure, which will result in higher demand for energy, railways, highways, transportation, housing, etc. Consequently, there will be a great need for construction and industrial equipment and components comprising hardwearing materials. For example, in 2009 alone, more than 15 million tons of wear-resistant material was used to produce excavator bucket teeth and more than 16 million tons of wear-resistant material was used for trash pump parts and piping.

Nonetheless, currently available hardwearing materials fail to exhibit satisfactory wear-resistant properties, particularly when subjected to harsh environments. When wearing parts fail or are in need of replacement, entire production lines may be shut down and/or equipment may be taken out of use. Thus, not only are losses incurred due to the direct cost of replacing the parts, but the loss resulting from reduced productivity or downtime can be significant.

Wear-resistant properties, lifetime, and price are the three main criteria used in the assessment and selection of hardwearing materials and corresponding hardwearing components. As demands for these hardwearing components increases and manufacturing technology improves, the desire for lower cost, longer lasting, and more wear-resistant materials will continue to grow.

Accordingly, systems and methods could benefit from improved devices and techniques for developing hardwearing materials and manufacturing hardwearing components. In particular, improved techniques and materials are needed to meet the demands of today's economy, including the need for lower-cost, longer-lasting, and/or more wear-resistant materials, components, and equipment.

SUMMARY OF THE DISCLOSURE

In accordance with certain embodiments of the present disclosure, systems and methods for producing a hardwearing or wear-resistant material are disclosed. In one aspect, a process for producing a wear-resistant material may comprise the mixing of a first group of materials to produce a first mixture. In one embodiment, the first group of materials may comprise zirconium dioxide, aluminum oxide, and optionally, at least one of calcium oxide and yttrium oxide.

In another aspect, the process may further comprise crushing the first mixture into granules of a desired average radius. The granules may then be mixed with a second group of materials to produce a second mixture. In one embodiment, the second group of materials may comprise carbon, chromium, and iron. In a further embodiment, the second group of materials may additionally comprise nickel, manganese, and titanium.

In a further aspect, the second mixture may be cast with a liquid metal to produce a third mixture. In some embodiments, the third mixture may then be insulated for a predetermined period of time and/or cooled to a solid state. In another embodiment, the third mixture may be subject to a heat treating process to yield the wear-resistant material.

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are illustrative and explanatory only and are not restrictive of the claims.

The accompanying drawings, which are incorporated in and constitute a part of this specification, illustrate several embodiments and together with the description, serve to explain the principles of the disclosure.

DESCRIPTION OF THE EMBODIMENTS

Disclosed herein are various embodiments of a system and method for producing a hardwearing or wear-resistant material. While the systems and methods described herein are primarily concerned with the development of hardwearing or wear-resistant materials for use in a construction, mining, or industrial setting, one skilled in the art will appreciate that the systems and methods described below can be used in other contexts, including residential and commercial settings, or any other setting in which equipment or a component is exposed to wear.

Reference will now be made in detail to certain illustrative embodiments, examples of which are illustrated in the accompanying drawings. Wherever possible, the same reference numbers will be used throughout the drawings to refer to the same or like items.

Figure 1:
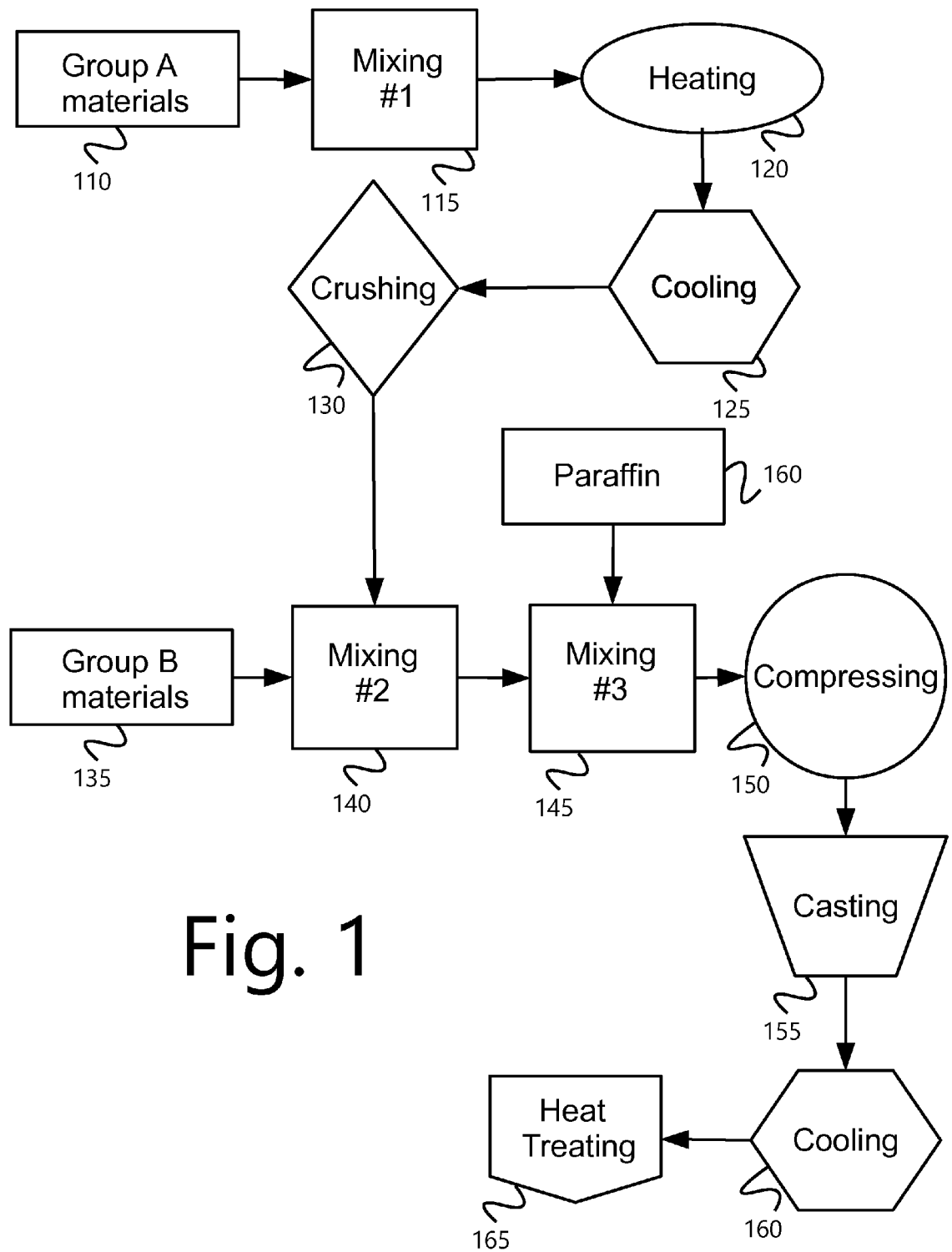
FIG. 1 depicts some aspects of an illustrative embodiment of a method as described herein.

FIG. 1 depicts one illustrative embodiment of a method for producing a hardwearing material. In one aspect, the method comprises a series of mixing, heating, and cooling steps. At step 110, a first plurality of materials (the "Group A" materials) may be provided. In one embodiment, the Group A materials may comprise zirconium dioxide ($ZrO_2$), aluminum oxide ($Al_2O_3$), and one or both of calcium oxide (CaO) and yttrium oxide ($Y_2O_3$). In other embodiments, the Group A materials may comprise any one or more, but not all, of zirconium dioxide, aluminum oxide, calcium oxide, and yttrium oxide. In further embodiments, Group A may comprise alternative or additional materials.

At step 115, the Group A materials may be fed into a mixer and mixed uniformly into a mixture 200 (depicted in FIG. 2 and described in more detail below). In one embodiment, the percentage by mass of each of the Group A materials in mixture 200 may be consistent with the ranges presented below in Table 1. In alternative embodiments, the percentage by mass of one or more of the Group A materials may be greater or less than the ranges presented in Table 1.

TABLE 1

| Material | $ZrO_2$ | $Al_2O_3$ | CaO and/or $Y_2O_3$ |
|---|---|---|---|
| Approx. mass percent (%) | 38.8-39.3 | 58.3-58.9 | 1.8-2.9 |

Although, in some embodiments, mixture 200 may comprise some combination of calcium oxide and yttrium oxide, alternative embodiments may comprise calcium oxide exclusive of yttrium oxide or only yttrium oxide exclusive of calcium oxide.

In another aspect, the mixer may comprise any suitable mixer for uniformly mixing the Group A materials. For example, the mixer may comprise a PMH 1/PML 1 Laboratory Planetary Mixer.

The Group A materials may be provided to the mixer in a solid state. Alternatively, one or more of the Group A materials may be provided to the mixer in a liquid state.

In a further embodiment, the Group A materials may be fed into the mixer in a predetermined order. For example, aluminum oxide may be fed into the mixer first, then the zirconium dioxide may be fed into the mixer, followed by one or both of calcium oxide (CaO) and yttrium oxide ($Y_2O_3$). Of course, the Group A materials may be fed into the mixer in any suitable order and the example(s) provided herein are only illustrative of the possibilities. Alternatively, one or more of the Group A materials may be fed into the mixer simultaneously.

At step 120, mixture 200 may be subjected to a heating step. In one embodiment, an electric arc furnace (EAF) may be used to heat mixture 200 and melt the mixture. The electric arc furnace may comprise, for example, a small AC Electric Arc Furnace. Of course, an EAF is only one example of a device suitable for heating and/or melting mixture 200 and any one or more suitable devices may be implemented in step 120. For example, one heating device or furnace may be used to pre-heat mixture 200 and one or more additional heating devices or furnaces may be used to melt mixture 200.

In one aspect, regardless of whether the heating and melting of mixture 200 is performed in one or more steps and/or using one or more heating devices or furnaces, mixture 200 may be heated to approximately 2730° C. (4946° F.). Of course, such a range is only meant as illustrative and mixture 200 may be heated and/or melted to any suitable temperature, including a temperature less than 2730° C. (4946° F.) or greater than 2730° C. (4946° F.).

Following step 120, mixture 200 may be cooled at step 125 to solidify the mixture. In one embodiment, mixture 200 may be cooled down naturally. Alternatively, mixture 200 may be cooled using any suitable one or more devices. In another aspect, mixture 200 may be cooled to approximately 21° C. (70° F.), i.e., approximately room temperature. Of course, such a temperature is only meant as illustrative and mixture 200 may be cooled to any suitable temperature at which mixture 200 solidifies, including a temperature a temperature between 21° C. (70° F.) and 30° C. (86° F.). In further embodiments, mixture 200 may be cooled to a temperature less than 21° C. (70° F.), including temperatures below 0° C. (32° F.).

At step 130, solid mixture 200 may be subjected to a crushing step. In one embodiment, a crusher may be used to crush the solid mixture 200 into granules. For example, a small Ceramic Jaw Crusher may be used to conduct the crushing step. Of course, a Jaw Crusher is only one example of a device suitable for crushing solid mixture 200, and any one or more suitable devices may be implemented in step 130. For example, one crushing device may be used to pre-crush solid mixture 200 into granules or pieces of a first size, and one or more additional crushing devices may be used to further crush mixture 200 into a desired granule size. In another aspect, the average desired size granule may be approximately 1 mm in radius. Of course, such a granule size is only meant as illustrative and mixture 200 may be crushed into any suitable size, including granules having an average radius between approximately 0.5 mm and approximately 2 mm. In alternative embodiments, mixture 200 may be crushed into granules having an average radius less than 0.5 mm or greater than 2 mm.

At step 135, a second plurality of materials (the "Group B" materials) may be provided. In one embodiment, the Group B materials may comprise manganese (Mn), titanium (Ti), carbon (C), chromium (Cr), iron (Fe), and nickel (Ni). In other embodiments, the Group B materials may comprise any one or more, but not all, of manganese, titanium, carbon, chromium, iron, and nickel. In further embodiments, Group B may comprise alternative or additional materials.

In one embodiment, the percentage by mass of each of the materials within Group B may be consistent with the ranges presented below in Table 2. In alternative embodiments, the percentage by mass of one or more of the Group B materials may be greater or less than the ranges presented in Table 2.

TABLE 2

| Material | Mn | Ti | C | Cr | Fe | Ni |
|---|---|---|---|---|---|---|
| Approx. mass percent (%) | 1 | 1 | 2-3 | 25-38 | 50-58 | 0-20 |

At step 140, the Group B materials may be fed into a mixer and mixed uniformly along with the mixture 200 granules to yield a mixture 300. In one embodiment, the mixer may comprise any suitable mixer for uniformly mixing the Group B materials with mixture 200 granules. For example, the mixer may comprise a PMH 1/PML 1 Laboratory Planetary Mixer. In some embodiments, the same mixer used at step 115 may be used at step 140. In other embodiments, one or more alternative or additional mixers may be used at step 140.

The Group B materials may be provided to the mixer in a solid state. Alternatively, one or more of the Group B materials may be provided to the mixer in a liquid state.

In a further embodiment, the Group B materials and the mixture 200 granules may be fed into a mixer in a predetermined order. In one illustrative embodiment, the Group B materials may be mixed at step 140 in the following order: iron, chromium, carbon, titanium, manganese, and nickel. The mixture 200 granules may then be fed into the mixer. Of course, such an order is only provided as an example. The Group B materials may be fed into the mixer in any suitable order and the example(s) provided herein are only illustrative of the possibilities. Alternatively, one or more of the Group B materials may be fed into the mixer simultaneously.

In another aspect, the Group B materials may be mixed with mixture 200 granules at approximately the same mass percentages, i.e., substantially equal amounts of the Group A and the Group B materials. In other embodiments, the Group A materials may comprise a greater mass percentage of mixture 300 than the Group B materials. Alternatively, the Group B materials may comprise a greater mass percentage of mixture 300 than the Group A materials.

At step 145, a liquid paraffin may be fed into a mixer with mixture 300 to yield mixture 310 (depicted in FIG. 3 and described in more detail below). Of course, liquid paraffin is only one example of a "glue" suitable for "gluing" or adhering the mixture materials together and any one or more suitable materials may be used at step 145. In other embodiments, a solid-state paraffin may be used.

Similar to steps 115 and 140, the mixer used to mix mixture 300 and the paraffin may comprise a PMH 1/PML 1 Laboratory Planetary Mixer. In some embodiments, the same mixer used at step 115 or 140 may be used at step 145. In other embodiments, one or more alternative or additional mixers may be used at step 145.

At step 150, mixture 310 may be subjected to a compressing step. In one embodiment, a hydraulic pressing machine may be used to compress mixture 310. Of course, a hydraulic pressing machine is only one example of a device suitable for compressing mixture 310 and any one or more suitable devices may be implemented in step 150. For example, one model device or box may be used to hold the mixture 310, and one or more additional compressing devices or machines may be used to compress mixture 310.

In one aspect, regardless of whether the shaping and compressing of mixture 310 is performed in one or more steps and/or using one or more compressing devices or machines, mixture 310 may be compressed at approximately 100 tons of pressure. Of course, such a pressure is only meant as illustrative and mixture 310 may be compressed at any suitable pressure, including a pressure greater than approximately 100 tons and less than approximately 200 tons. In other embodiments, mixture 310 may be compressed at a pressure less than 100 tons.

In another aspect, the mixture 310 may be compressed into a honeycomb-like structure. In one embodiment, the honeycomb-like structure may comprise cylindrical holes or apertures having a diameter of approximately 25 mm, and an average distance between two adjacent holes of approximately 30 mm (depicted in FIG. 4 and described in more detail below). Of course, such diameters and separation are only meant as illustrative and mixture 310 may be compressed to any suitable structure, and such structure may comprise holes of any suitable diameter that are separated by any suitable distance, provided the materials comprising mixture 310 can be uniformly mixed with a casting liquid (as described below) within the honeycomb.

In some embodiments, the density of material 200 (shown in FIG. 2) may be less than liquid steel. Thus, where material 310 is subsequently cast with liquid steel, mixture 310 may separate and/or solidified granules 380 of mixture 200 (depicted in FIG. 3) may float to the surface of the mixture. Where mixture 310 is compressed into a honeycomb structure, the holes or apertures not only hold all the mixed components, but they also may facilitate a uniform mixing of the casting liquid within the honeycomb. In alternative embodiments, mixture 310 may be compressed into any suitable structure and/or comprise no holes or apertures. In further embodiments, rather than compressing mixture 310 into a structure comprising holes or apertures, mixture 310 may be compressed into a structure comprising dimples or some other textured surface.

At step 155, the compressed mixture 310 may be placed into a sandbox for casting. Of course, a sandbox is only one device for casting mixture 310 and any one or more suitable devices may be implemented in step 155. In one embodiment, mixture 310 may be cast with liquid high-chromium steel or liquid high-manganese steel to yield a casted mixture 320. In alternative embodiments, mixture 310 may be cast with some other material to yield casted mixture 320.

After casting, mixture 320 may be insulated for an amount of time. In one embodiment, the hot casted mixture 320 may be stored in an incubator for approximately 1 hour. Alternatively, mixture 320 may be insulated for an amount of time less than approximately 3 hours and longer than approximately 40 minutes. Of course, these insulation times are only illustrative of the possibilities and mixture 320 may be insulated for any suitable period of time.

Following step 155, casted mixture 320 may be cooled at step 160 to solidify the mixture. In one embodiment, casted mixture 320 may be cooled down naturally. Alternatively, casted mixture 320 may be cooled using any suitable one or more devices. In another aspect, casted mixture 320 may be cooled to approximately 21° C. (70° F.), i.e., approximately room temperature. Of course, such a temperature is only meant as illustrative and casted mixture 320 may be cooled to any suitable temperature at which casted mixture 320 solidifies, including a temperature between 21° C. (70° F.) and 30° C. (86° F.). In further embodiments, casted mixture 320 may be cooled to a temperature less than 21° C. (70° F.), including temperatures below 0° C. (32° F.).

At step 165, heat treatment may be applied to the casted mixture 320. In particular, a process comprising heating and cooling of the casted mixture 320 may be used to achieve one or more desired physical and/or mechanical properties through modification of its crystalline structure. The temperature, length of time, and rate of cooling after heat treatment may all impact the mixture's properties. Among other things, the heat treatment may increase the strength or hardness, increase the toughness, improve the ductility, and/or maximize the corrosion resistance of casted mixture 320.

Figure 2:
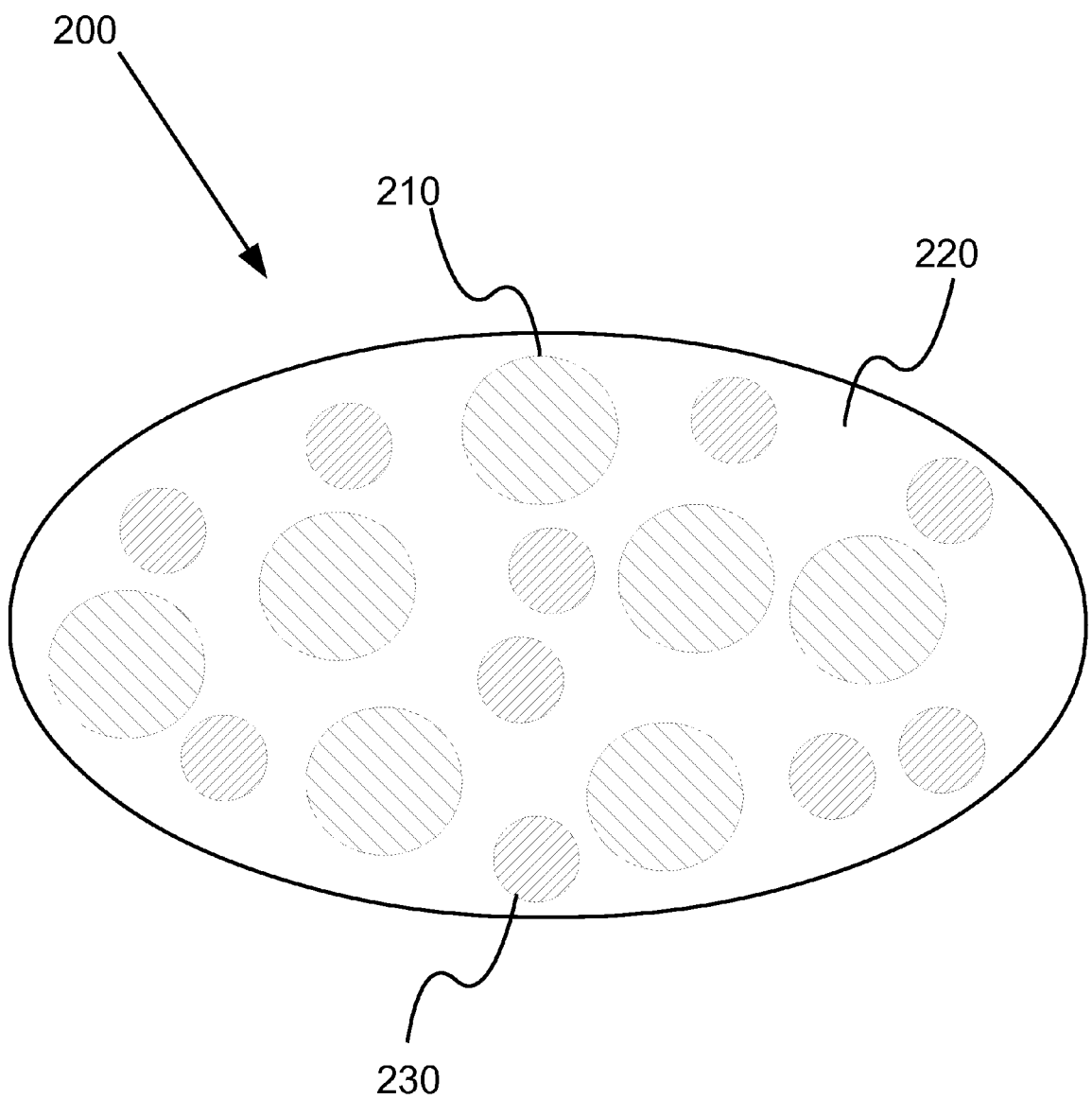
FIG. 2 depicts some aspects of an illustrative embodiment of a material as described herein.

FIG. 2 illustrates an embodiment of mixture 200 described above with respect to FIG. 1. As described above, mixture 200 may comprise zirconium dioxide 210 mixed with aluminum oxide 220 and one or both of calcium oxide and yttrium oxide 230. In other embodiments, mixture 200 may comprise any one or more, but not all, of zirconium dioxide, aluminum oxide, calcium oxide, and yttrium oxide. In further embodiments, Group A may comprise alternative or additional materials.

Figure 3:
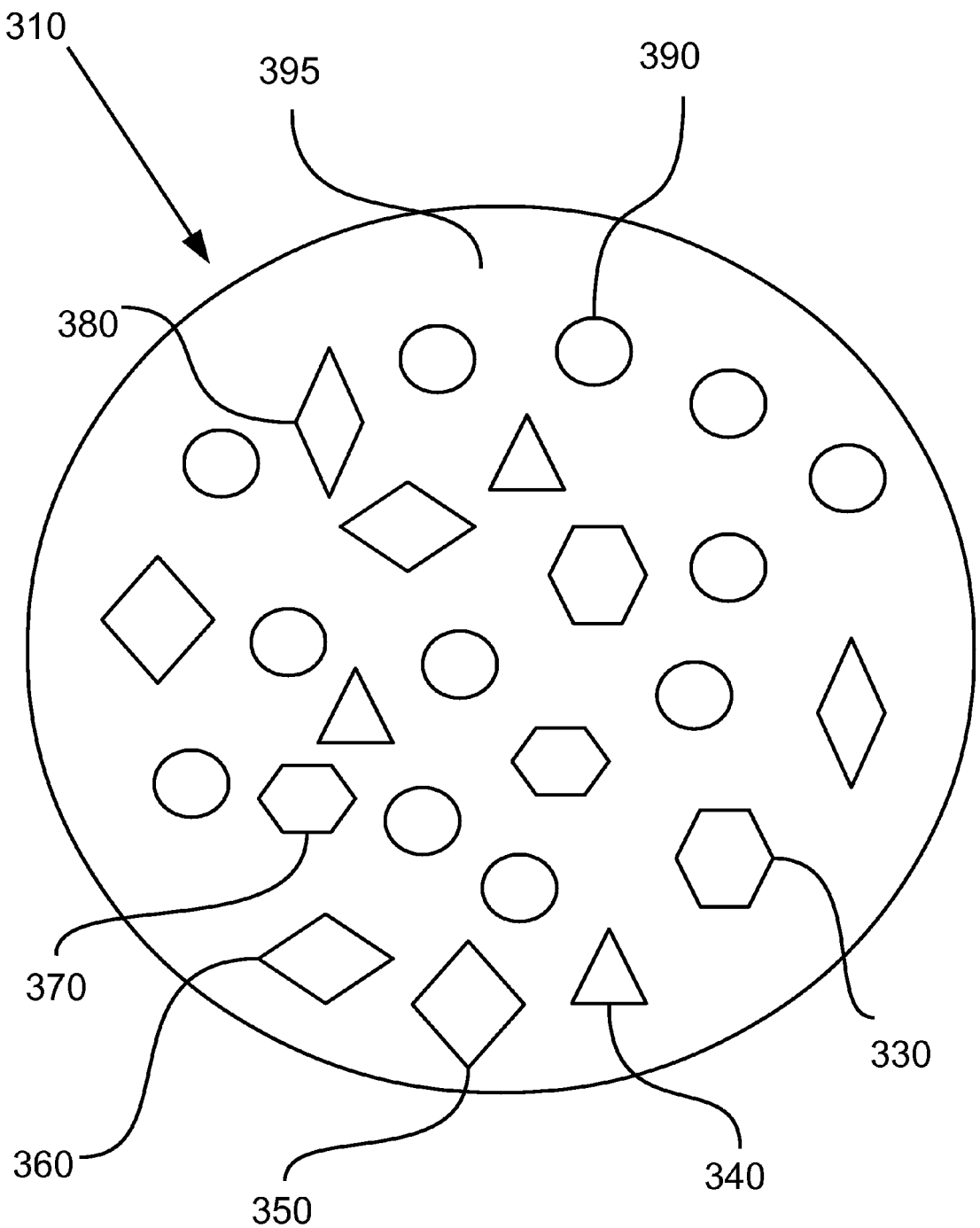
FIG. 3 depicts some aspects of an illustrative embodiment of a material as described herein.

FIG. 3 illustrates an embodiment of mixture 310 described above with respect to FIG. 1. As described above, mixture 310 may comprise iron 330, nickel 340, manganese 350, titanium 360, carbon 370, chromium 380, and mixture 200. In particular, mixture 200 may be in the form of solidified granules 390 when it is mixed with the other materials of mixture 310. Mixture 310 may further comprise a paraffin 395.

Figure 4:
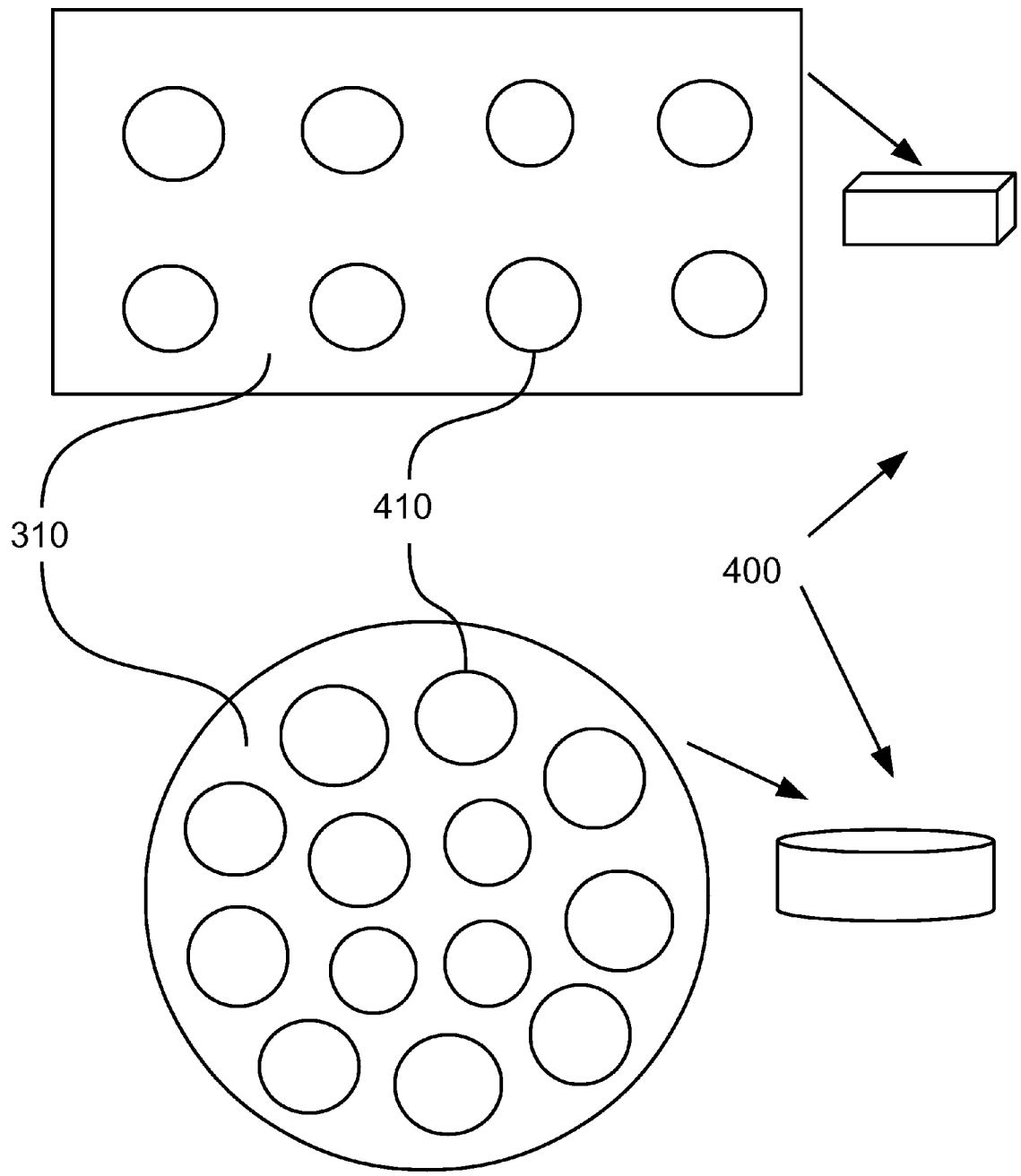
FIG. 4 depicts some aspects of an illustrative embodiment of a material as described herein.

FIG. 4 illustrates an embodiment of a compressed form described above with respect to FIG. 1. As described above, a honeycomb structure 400 may comprise a rectangular or cylindrical shape. Alternatively, the honeycomb structure may comprise some other desired shape. Moreover, the structure may or may not comprise holes 410 within compressed mixture 310, as described above.

Additional features may also be incorporated into the described systems and methods to improve their functionality. For example, systems and/or methods may be devised for sub-dividing one or more of the aforementioned mixing, heating, cooling, crushing, compressing, casting, or heat treating steps in order to expedite manufacture of the hardwearing material, reduce strain on the associated equipment, and/or increase system yields. Moreover, alternative or additional materials may be introduced into the Group A materials, Group B materials, mixture 200, mixture 300, or mixture 310 in order to influence the properties of the resulting hardwearing materials.

Other embodiments of the aforementioned systems and methods will be apparent to those skilled in the art from consideration of the specification and practice of this disclosure. It is intended that the specification and examples be considered as illustrative only, with the true scope and spirit of the disclosure being indicated by the following claims.

What is claimed is:

1. A process for producing a wear-resistant material, the process comprising:
    providing a first group of materials, the first group of materials comprising zirconium dioxide and aluminum oxide;
    mixing the first group of materials to produce a first mixture;
    crushing the first mixture to produce a plurality of granules;
    providing a second group of materials, the second group of materials comprising carbon, chromium, and iron;
    mixing the second group of materials with the plurality of granules to produce a second mixture; and
    casting the second mixture with a liquid metal to produce the wear-resistant material.

2. The process of claim 1, wherein the first group of materials further comprises at least one of calcium oxide and yttrium oxide.

3. The process of claim 2, wherein the first group of materials comprises, by mass percentage, approximately 38.8% to 39.3% of zirconium dioxide, approximately 58.3% to 58.9% of aluminum oxide, and approximately 1.8% to 2.9% of at least one of calcium oxide and yttrium oxide.

4. The process of claim 2, further comprising heating the first mixture to a liquid state.

5. The process of claim 4, wherein the heating the first mixture comprises heating the first mixture to a temperature of at least approximately 2730° C.

6. The process of claim 4, further comprising:
    after the heating the first mixture, cooling the first mixture to a solid state before the crushing the first mixture to produce a plurality of granules.

7. The process of claim 6, wherein the cooling the first mixture to a solid state comprises cooling the first mixture to approximately room temperature.

8. The process of claim 6, the plurality of granules having an average radius of less than approximately 1 mm.

9. The process of claim 8, the plurality of granules having an average radius of less than approximately 0.5 mm.

10. The process of claim 1 wherein the liquid metal comprises at least one of high-chromium steel or high-manganese steel.

11. A process for producing a wear-resistant material, the process comprising:
    mixing a first group of materials to produce a first mixture, the first group of materials comprising zirconium dioxide and aluminum oxide;
    crushing the first mixture to produce a plurality of granules;
    mixing the granules with a second group of materials to produce a second mixture, the second group of materials comprising carbon, chromium, and iron to produce a second mixture; and
    casting the second mixture with a liquid metal.

12. The process of claim 11, wherein the second group of materials comprises, by mass percentage, approximately 2% to 3% of carbon, approximately 25% to 38% of chromium, and approximately 50% to 58% of iron.

13. The process of claim 11, wherein the second group of materials further comprises at least one of nickel, manganese, and titanium.

14. The process of claim 13, further comprising mixing the second group of materials with a paraffin before mixing the granules with the second group of materials.

15. The process of claim 14, further comprising compressing the second mixture into a honeycomb structure comprising a plurality of apertures.

16. The process of claim 15, wherein the casting comprises casting the honeycomb structure with the liquid metal to produce a third mixture.

17. The process of claim 16, wherein the liquid metal comprises at least one of high-chromium steel or high-manganese steel.

18. The process of claim 16, further comprising insulating the third mixture for a predetermined period of time.

19. The process of claim 18, further comprising cooling the third mixture to a solid state.

20. The process of claim 19, further comprising subjecting the cooled third mixture to a heat treating process.

* * * * *